US010162442B2

(12) United States Patent
Wen et al.

(10) Patent No.: US 10,162,442 B2
(45) Date of Patent: Dec. 25, 2018

(54) COMPLIANT SUPPORT FOR A DISPLAY DEVICE

(71) Applicant: Microsoft Technology Licensing, LLC, Redmond, WA (US)

(72) Inventors: Chien-Hui Wen, Redmond, WA (US); Adam Petri, Seattle, WA (US); Stephan Alexander Cummings, Wilsonville, OR (US); Eric M. Leong, Kirkland, WA (US); Kabir Siddiqui, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 977 days.

(21) Appl. No.: 14/039,451

(22) Filed: Sep. 27, 2013

(65) Prior Publication Data
US 2015/0091839 A1    Apr. 2, 2015

(51) Int. Cl.
*G06F 3/041*     (2006.01)
*G06F 3/0488*    (2013.01)
*G06F 1/16*      (2006.01)

(52) U.S. Cl.
CPC .......... *G06F 3/0414* (2013.01); *G06F 1/1637* (2013.01); *G06F 3/0488* (2013.01)

(58) Field of Classification Search
CPC .......... G06F 1/16; G06F 3/041; G06F 3/0488; G06F 3/0414; G06F 1/1637; H05K 7/20; F16M 13/00; F16M 13/02
See application file for complete search history.

(56) References Cited

U.S. PATENT DOCUMENTS

| 5,548,430 | A | 8/1996 | Kuo |
| 6,151,207 | A | 11/2000 | Kim |

(Continued)

FOREIGN PATENT DOCUMENTS

| CN | 1598635 A | 3/2005 |
| CN | 1598653 A | 3/2005 |

(Continued)

OTHER PUBLICATIONS

"International Preliminary Report on Patentability Issued in PCT Application No. PCT/US2014/056858", dated Dec. 18, 2015, 8 Pages.

(Continued)

*Primary Examiner* — Tim T Vo
*Assistant Examiner* — Phong H Dang
(74) *Attorney, Agent, or Firm* — NovoTechIP International PLLC

(57) ABSTRACT

A compliant support for a display device is described. In one or more implementations, an apparatus includes an external enclosure configured to assume a mobile computing device configuration and one or more computing components secured by and disposed within the external enclosure. The one or more computing components are configured to perform one or more operations that are specified by software. A display device is secured to the external enclosure such that the display device is viewable by a user, the display device supporting touchscreen functionality. A compliant support is disposed between the one or more computing components and the display device, the compliant support configured to reduce deflection of the display device by compression of the compliant support, the deflection caused in response to contact against a surface of the display device.

20 Claims, 6 Drawing Sheets

(56) References Cited

U.S. PATENT DOCUMENTS

| | | | |
|---|---|---|---|
| 6,703,640 B1* | 3/2004 | Hembree | G01R 1/0466 257/48 |
| 6,784,948 B2 | 8/2004 | Kawashima et al. | |
| 8,144,453 B2 | 3/2012 | Brown et al. | |
| 8,347,221 B2 | 1/2013 | Griffin et al. | |
| 2005/0057703 A1* | 3/2005 | Tsubokura | G02F 1/13394 349/58 |
| 2006/0158835 A1* | 7/2006 | Lin | H05K 5/02 361/679.22 |
| 2008/0239641 A1* | 10/2008 | Sato | G06F 1/1616 361/679.27 |
| 2009/0128501 A1* | 5/2009 | Lazaridis | G06F 3/0414 345/173 |
| 2009/0244853 A1 | 10/2009 | Takahashi | |
| 2010/0085303 A1 | 4/2010 | Kwok et al. | |
| 2010/0245254 A1* | 9/2010 | Olien | G06F 3/041 345/173 |
| 2011/0011998 A1* | 1/2011 | Shoji | H05K 7/142 248/225.11 |
| 2011/0312388 A1 | 12/2011 | Park et al. | |
| 2012/0268667 A1* | 10/2012 | Paleczny | G06F 1/1637 349/1 |
| 2013/0027853 A1* | 1/2013 | Chen | H05K 5/0017 361/679.01 |

FOREIGN PATENT DOCUMENTS

| | | |
|---|---|---|
| CN | 1747105 A | 3/2006 |
| CN | 102905485 A | 1/2013 |
| EP | 0730185 | 9/1996 |
| EP | 2128747 | 12/2009 |
| EP | 2431840 | 3/2012 |

OTHER PUBLICATIONS

"International Search Report and Written Opinion", Application No. PCT/US2014/056858, dated May 4, 2015, 12 Pages.

"Second Written Opinion", Application No. PCT/US2014/056858, dated Aug. 27, 2015, 7 Pages.

"First Office action and Search Report Issued in Chinese Patent Application No. 201480053501.4", dated Jun. 8, 2018, 16 pages.

* cited by examiner

COMPLIANT SUPPORT FOR A DISPLAY DEVICE

BACKGROUND

The configuration of computing device is ever increasing, from traditional desktop personal computers to mobile computing devices such as mobile phones, tablet computers, and so on. However, these configurations could cause complications in interaction with the devices.

One such example is that conventional display devices may form visual display artifacts during operation and user interaction, which could hinder a user's interaction and experience with the devices. For example, a contact against a liquid crystal display device could cause disruption of the liquid crystals, which could be viewed as a visual artifact by a user.

SUMMARY

A compliant support for a display device is described. In one or more implementations, an apparatus includes an external enclosure configured to assume a mobile computing device configuration and one or more computing components secured by and disposed within the external enclosure. The one or more computing components are configured to perform one or more operations that are specified by software. A display device is secured to the external enclosure such that the display device is viewable by a user, the display device supporting touchscreen functionality. A compliant support is disposed between the one or more computing components and the display device, the compliant support configured to reduce deflection of the display device by compression of the compliant support, the deflection caused in response to contact against a surface of the display device.

In one or more implementations, a mobile computing device includes an external enclosure configured to be held in one or more hands of a user and one or more computing components secured by and disposed within the external enclosure. The mobile computing device also includes a display device secured to the external enclosure such that the display device is viewable by a user, the display device supporting touchscreen functionality. A compliant support is disposed between the one or more computing components and the display device. The compliant support is configured to reduce deflection of the display device by deformation of the compliant support, the deflection caused in response to contact against a surface of the display device.

In one or more implementations, an apparatus includes a display device tray and a display device secured to the display tray such that the display device is viewable by a user when secured to an external enclosure of a computing device. The display device supports touchscreen functionality. A compliant support is disposed between the display device tray and the display device. The compliant support is configured to reduce deflection of the display device by compression of the compliant support, the deflection caused in response to contact received to interact with the touchscreen functionality of the display device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Display devices having touchscreen functionality may come in a wide variety of configurations. This may include configurations that include monitors for use with a desktop personal computer, a laptop computer, tablet computer, mobile phone, portable gaming device, and so on. However, in some instances, especially in configurations that are configured to support a mobile communication device (e.g., mobile phone, tablet computer, and so on), deflection of the display device may cause display of visual artifacts when contacted.

For example, the display device may be configured as a touch display module (TDM) that includes a liquid crystal display (LCD), touch sensor, electronic connections, and layers of glass. A user may then view and interact with images displayed by the TDM by touching a surface of the TDM. However, some conventional techniques supported the TDM at the edges of the glass, which resulted in pressure caused by this contact to create deflections of the glass. This may cause the liquid crystals to become disrupted, which may cause a visual defect to be projected along the edges of the TDM.

Accordingly, techniques are described herein in which a compliant support is provided for a display device. The compliant support may act as a backer layer to help reduce this deflection and consequently the visual artifacts that may be caused. The compliant support may be configured in a variety of ways to support this functionality as well as other functionality, such as through construction as a thermal pad that is configured to transfer heat from one or more components of a computing device that employs the compliant support. Further discussion of this and other examples may be found in the followings sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
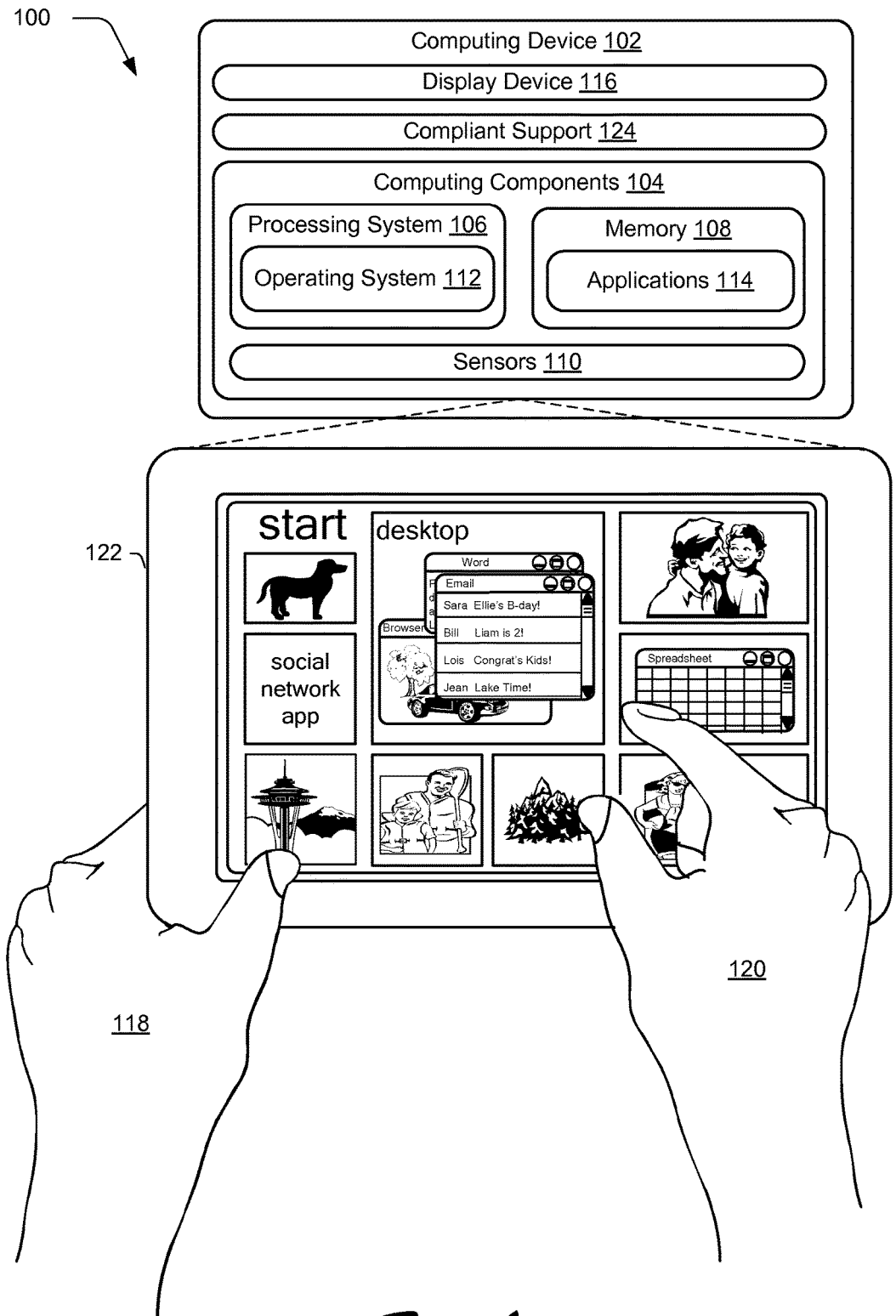
FIG. 1 is an illustration of an environment in an example implementation that is operable to employ a display device utilizing the compliant support techniques described herein.

FIG. 1 is an illustration of an environment 100 in an example implementation that is operable to employ techniques described herein. The illustrated environment 100 includes a computing device 102. In this example, the computing device 102 includes one or more computing components 104 which may be configured to perform and/or assist in performance of one or more operations of the computing device 102, e.g., in execution of instructions specified by software. Examples of computing components 104 include a processing system 106, memory 108, and sensors 110 with examples of software that include an operating system 112 and applications 114.

The computing device 102 may be configured in a variety of ways. For example, a computing device may be configured as a computer that is capable of communicating over a network, such as a desktop computer, a mobile station, an entertainment appliance, a set-top box communicatively coupled to a display device, a wireless phone, a game console, educational interactive devices, point of sales devices, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). Additionally, although a single computing device 102 is shown, the computing device 102 may be representative of a plurality of different devices, such as multiple servers utilized by a business to perform operations such as by a web service, a remote control and set-top box combination, an image capture device and a game console configured to capture gestures, and so on. In addition, it may apply to apparatuses including a plurality of display devices, e.g., a clam shell configuration.

The computing device 102 may support a variety of different interactions. For example, the computing device 102 may include one or more hardware devices that are configured to be manipulated by a user to interact with the device, such as a keyboard, cursor control device (e.g., mouse), and so on. The computing device 102 may also support gestures, which may be detected in a variety of ways. The computing device 102, for instance, may support touch gestures that are detected using touchscreen functionality of the computing device 102.

The sensors 110, for instance, may be configured to provide touchscreen functionality in conjunction with the display device 116. The sensors 110, for instance, may be configured as capacitive, resistive, acoustic, light (e.g., sensor in a pixel), and so on that are configured to detect proximity of an object. An example of this is illustrated in FIG. 1 in which first and second hands 118, 120 of a user are illustrated. The first hand 118 of the user is shown as holding an external enclosure 122 (e.g., housing) of the computing device 102. The second hand 120 of the user is illustrated as providing one or more inputs that are detected using touchscreen functionality of the display device 116 to perform an operation, such as to make a swipe gesture to pan through representations of applications in the start menu of the operating system 112 as illustrated. This may also apply to user input with an active or passive stylus.

However, interaction with the display device 116 in this manner may cause visual artifacts to be output by the display device 116 in some conventional configurations. For example, a pressure applied by one or more fingers of the user's hand 118 may cause the display device 116 to display a visual artifact. Further, visual artifacts may be caused in a variety of other ways by conventional display devices, such as due to stresses introduced during manufacture of the display device 116, manufacture of the display device 166 as part of the computing device 102 (e.g., within the external enclosure 122), and so on. In such a case, the display artifact may become permanent. Accordingly, techniques are presented herein in which a compliant support 124 is utilized to reduce or even eliminate visual artifacts and other complications, further description of which may be found in relation to the following discussion and associated figure.

Figure 2:
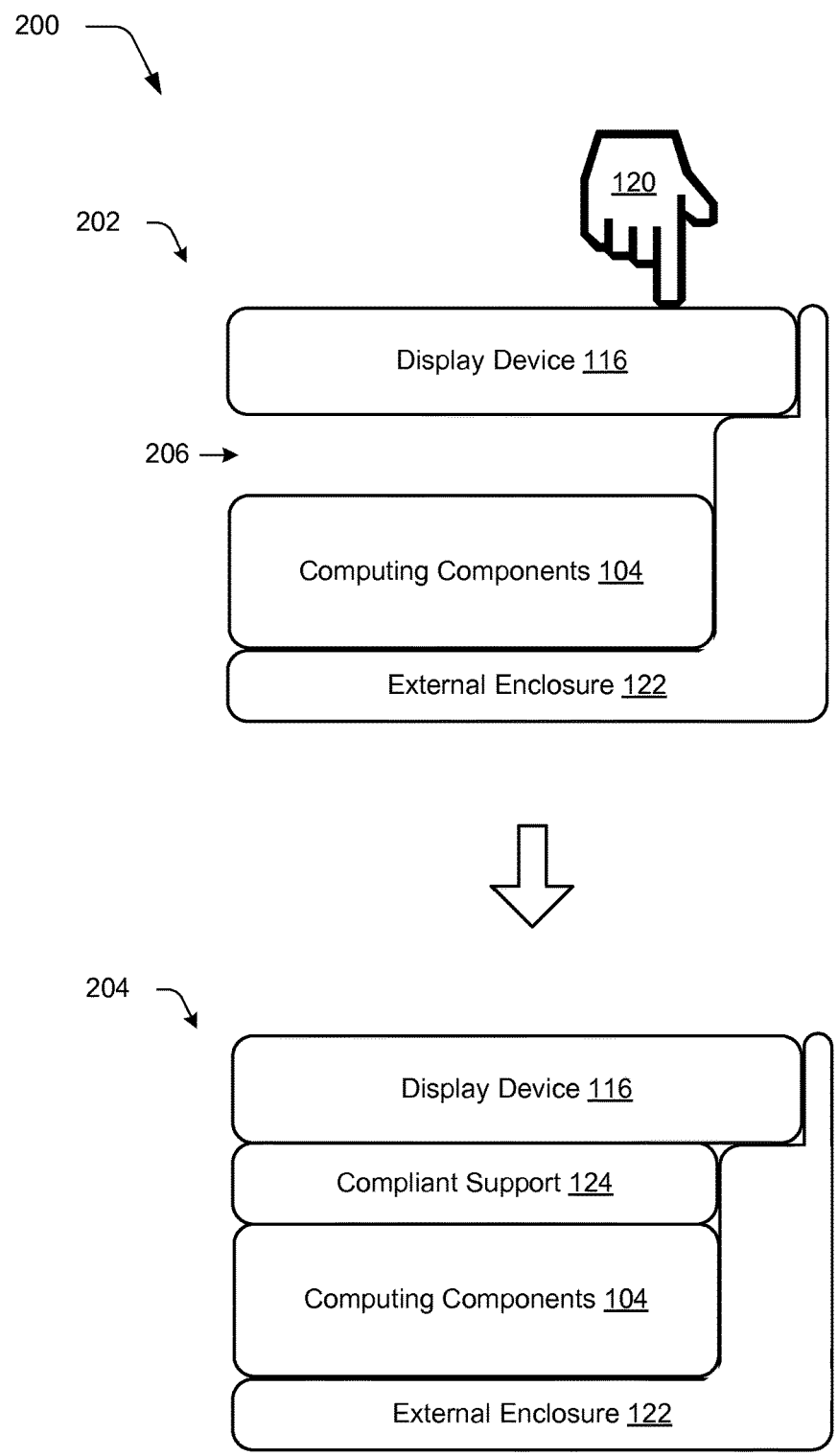
FIG. 2 depicts a system in an example implementation in which assembly is shown of a display device as part of a computing device of FIG. 1.

FIG. 2 depicts a system 200 in an example implementation in which assembly of a display device 116 as part of a computing device 102 is shown. This system 200 illustrates assembly of the computing device 102 using first and second stages 202, 204. At the first stage 202, the external enclosure 122 is illustrated as forming a cavity in which computing components 104 of the computing device 102 may be disposed within. These computing components 104 may include the processing system 106, memory 108, sensors 110, and other components of the computing device 102, such as graphics processing units, and so on.

As illustrated in this instance, positioning of the display device 116 in the external enclosure 122 has caused a gap 206 to form between the display device 116 and computing components 104 of the computing device 102. This gap 206 may cause pressure applied to the display device 115 (e.g., from a finger of the user's hand 120) to cause deflections of the display device 116 and therefore output of visual artifacts.

At the second stage 204, a compliant support 124 is included that is configured to reduce deflection of the display device 116 responsive to a pressure applied to a surface of a display device 116. The compliant support 124, for instance, may be configured to reduce deflection of the display device 116 along an axis that is generally perpendicular to a surface of the display device 116, e.g., as shown by a finger of a the user's hand 120 at the first stage 120.

The compliant support 124 may also be configured to apply a pressure against the display device (e.g., a back force) to further support the display device 116 and reduce deflection caused by forces against an outer surface of the display device 116. In other words, the compliant support 124 may be configured to apply a force to an "underside" of the display device 116, i.e., a surface of the display device 116 that is disposed opposite to a surface used to display an output by the display device 116. The compliant support 124 may be formed in a variety of different ways, an example of which is described as follows and shown in a corresponding figure.

Figure 3:
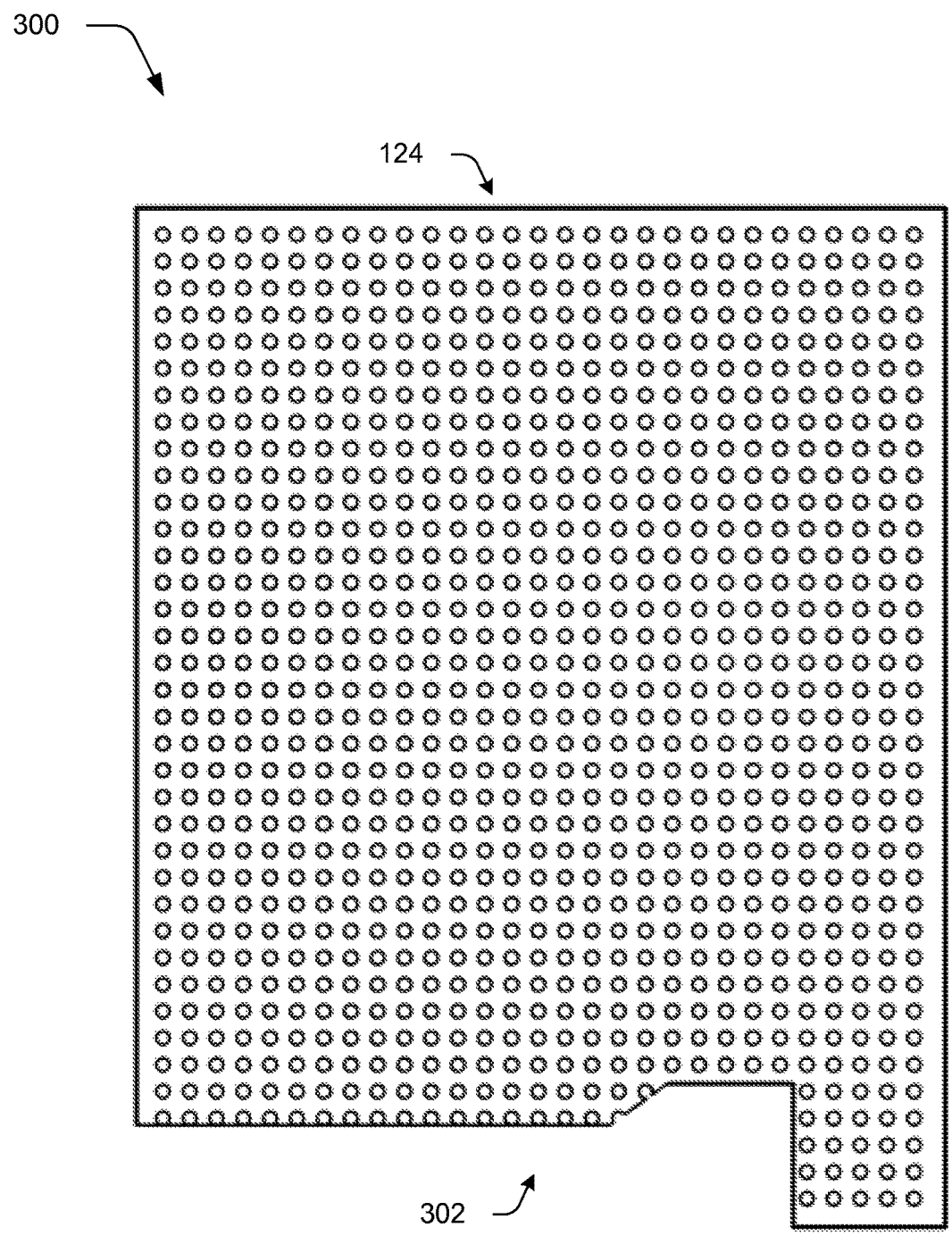
FIG. 3 depicts an example of the compliant support of FIG. 1 as being formed using a foam having a plurality of holes.

FIG. 3 depicts an example 300 showing the compliant support 124 being implemented using foam having a plurality of holes. The foam may be implemented as a cut-to-size padding to fit underneath the display device 116, e.g., such as cut 302 to form around a portion of the display device 116 that includes ports and other circuitry. The compliant support 124 may also be configured to have different thickness to form a complementary shape to the display device 116 and/or the computing components 104 of the computing device 102. Further, although illustrated as a single piece the compliant support 124 may be configured as a plurality of different pieces.

The foam is configured in this example to have holes. The holes may thus allow material of the compliant support 124 to flow into the holes when the compliant support is compressed. Thus, the material of the compliant support 124 may be configured to deform in response to an applied pressure. Although illustrated as a foam having holes in this example, the compliant support 124 may be configured in a variety of different ways, such as solid deformable materials, plastics, gels, mechanical devices (e.g., springs), compressed gases, and so on. Further, different portions of the compliant support 124 may be configured to supply different amounts of resistance to compression, an example of which is described as follows and shown in a corresponding figure.

Figure 4:
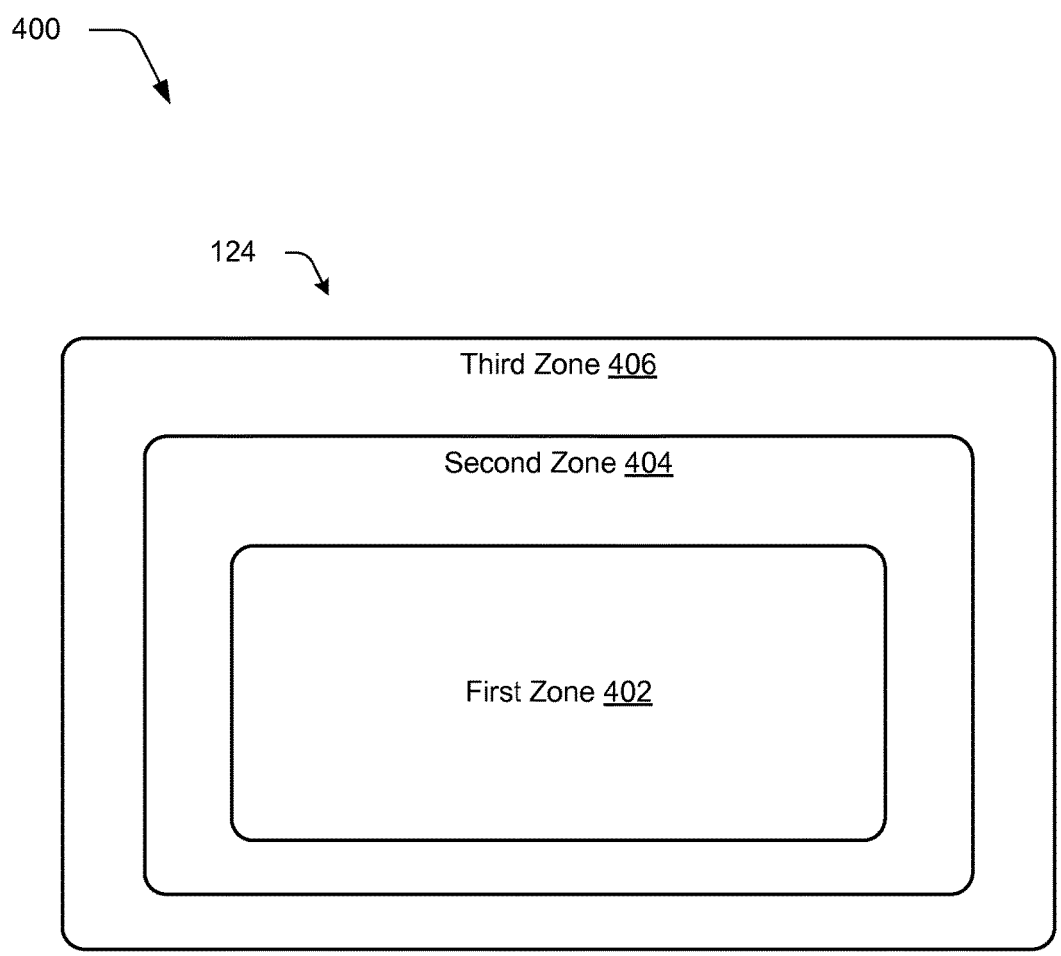
FIG. 4 depicts an example of the compliant support of FIG. 1 that includes a plurality of zones, each configured to provide different amounts of support to resist deflection of the display device.

FIG. 4 depicts an example 400 of the compliant support 124 that includes a plurality of zones, each configured to provide different amounts of support to resist deflection of the display device 116. In this example, the compliant support 124 includes first, second, and third zones 402, 404, 406.

Each of the different zones is configured to provide different amounts of resistance, thereby provide differing amounts of support to a display device 116 disposed over the compliant support 124. For example, the third zone 406 may be configured to provide a greater amount of support around the edges of the external enclosure 122 than that provided by the second and first zones 404, 402, respectively. Thus, deflection and corresponding creation of artifacts along the edges may be reduced as previously described with greater amounts of deflection permitted along a center of the display device 116, e.g., to resist breakage.

These compliant material 124 may be configured in a variety of different ways to support these differences, such as different sizes and/or frequency of holes used in a foam, use of different materials, mechanical devices having different spring strengths, and so forth. Further, although shown as nested zones in which one zone is substantially surrounded by another zone and so on, the zones may be configured in a variety of ways, such as to support edges and address a type and/or expected amount of pressure that is to be applied to different parts of the display device 116, and so forth.

In the previous examples, the compliant support 124 is configured to contact both the display device 116 and computing components 104, such as to conserve space to promote thinness in a mobile form factor. The compliant support 124 may also be used as part of a mechanical support, an example of which is described as follows and shown in a corresponding figure.

Figure 5:
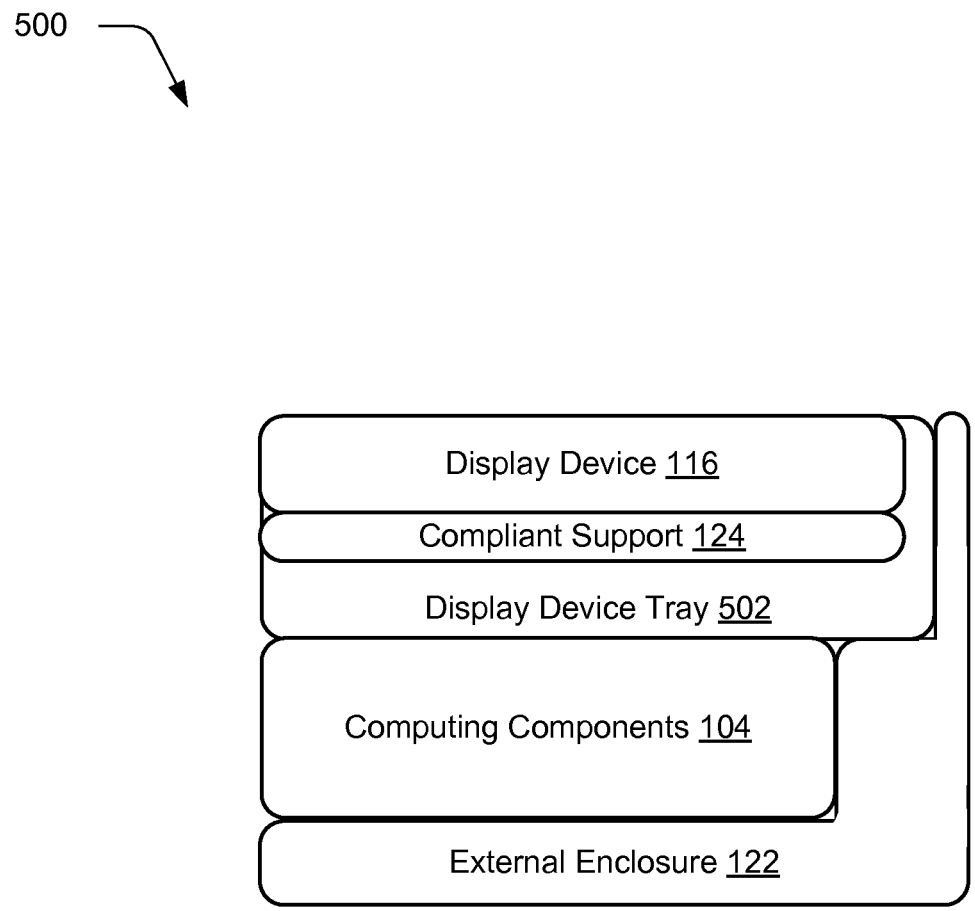
FIG. 5 depicts a system in an example implementation in which assembly is shown of a display device as part of a computing device of FIG. 1 that includes a display device tray.

FIG. 5 depicts an example 500 of assembly of a computing device 102 of FIG. 1 that includes a display device tray. In this example, the computing components 104 are assembled into the external enclosure 122 as before. A device tray 502 in this example is configured to be attached to and supported by the external enclosure 122.

The display device tray 502, for instance, may be configured to include a cavity and sides similar to the external enclosure 122 that provide a mechanical stiffness. The compliant support 124 is then positioned in the display device tray 502 with the display device 116 disposed over the compliant support 124. These three components may be assembled together, which is then disposed within the external enclosure 122 to assemble the computing device 102. Thus, in this example, the compliant support 124 may be configured to fill a gap between the display device 116 and display device tray 502 and may provide positive pressure, support zones, and so on as previously described.

Example Device

Figure 6:
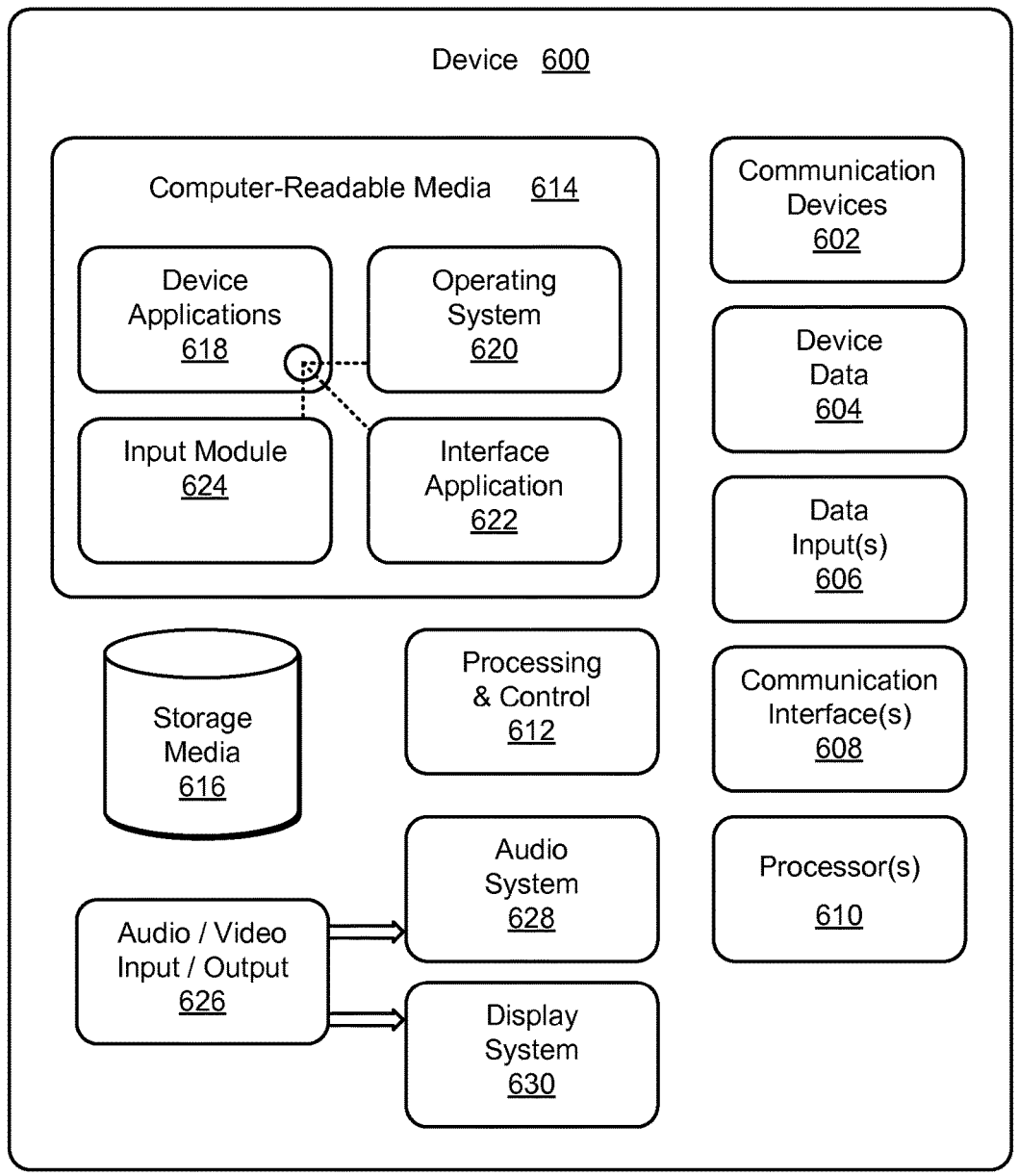
FIG. 6 depicts a system showing an example of the touch panel assembly and display module in greater detail.

FIG. 6 illustrates various components of an example device 600 that can be implemented as any type of portable and/or computer device as described with reference to FIGS. 1-5 to implement embodiments of the gesture techniques described herein. Device 600 includes examples of computing components 104, such communication devices 602, data inputs 606, communication interfaces 608, processors 610, processing and control 612, computer-readable media 614 (e.g., non-transitory forms of media that do not include signals per se), storage media, audio/video input/output 626, and an audio system 628. The device 600 may also include a display system 630 to support an output to a display device 116 of FIG. 1. These devices may be configured in a variety of different ways.

Communication devices 602, for instance, may enable wired and/or wireless communication of device data 604 (e.g., received data, data that is being received, data scheduled for broadcast, data packets of the data, etc.). The device data 604 or other device content can include configuration settings of the device, media content stored on the device, and/or information associated with a user of the device. Media content stored on device 600 can include any type of audio, video, and/or image data. Device 600 includes one or more data inputs 606 via which any type of data, media content, and/or inputs can be received, such as user-selectable inputs, messages, music, television media content, recorded video content, and any other type of audio, video, and/or image data received from any content and/or data source.

Device 600 also includes communication interfaces 608 that can be implemented as any one or more o\f a serial and/or parallel interface, a wireless interface, any type of network interface, a modem, and as any other type of communication interface. The communication interfaces 608 provide a connection and/or communication links between device 600 and a communication network by which other electronic, computing, and communication devices communicate data with device 600.

Device 600 includes one or more processors 610 (e.g., any of microprocessors, controllers, and the like) which process various computer-executable instructions to control the operation of device 600 and to implement embodiments described herein. Alternatively or in addition, device 600 can be implemented with any one or combination of hardware, firmware, or fixed logic circuitry that is implemented in connection with processing and control circuits which are generally identified at 612. Although not shown, device 600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 600 also includes computer-readable media 614, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 600 can also include a mass storage media device 616.

Computer-readable media 614 provides data storage mechanisms to store the device data 604, as well as various device applications 618 and any other types of information and/or data related to operational aspects of device 600. For example, an operating system 620 can be maintained as a computer application with the computer-readable media 614 and executed on processors 610. The device applications 618 can include a device manager (e.g., a control application, software application, signal processing and control module, code that is native to a particular device, a hardware abstraction layer for a particular device, etc.). The device applications 618 also include any system components or modules to implement embodiments of the gesture techniques described herein. In this example, the device applications 618 include an interface application 622 and an input module 624 (which may be the same or different as input module 114) that are shown as software modules and/or computer applications. The input module 624 is representative of software that is used to provide an interface with a device configured to capture inputs, such as a touchscreen, track pad, camera, and so on. Alternatively or in addition, the interface application 622 and the input module 624 can be implemented as hardware, software, firmware, or any combination thereof. Additionally, the input module 624 may be configured to support multiple input devices, such as separate devices to capture touch and stylus inputs, respectively. For example, the device may be configured to include dual display devices, in which one of the display device is configured to capture touch inputs while the other stylus inputs.

Device 600 also includes an audio and/or video input-output system 626 that provides audio data to an audio system 628 and/or provides video data to a display system 630. The audio system 628 and/or the display system 630 can include any devices that process, display, and/or otherwise render audio, video, and image data. Video signals and audio signals can be communicated from device 600 to an audio device and/or to a display device via an RF (radio frequency) link, S-video link, composite video link, component video link, DVI (digital video interface), analog audio connection, or other similar communication link. In an embodiment, the audio system 628 and/or the display system 630 are implemented as external components to device 600. Alternatively, the audio system 628 and/or the display system 630 are implemented as integrated components of example device 600.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. An apparatus comprising:
    an external enclosure configured as a mobile computing device configuration;
    one or more computing components secured by and disposed within a cavity formed within the external enclosure, the one or more computing components configured to perform one or more operations that are specified by software;
    a display device secured to the external enclosure such that the display device is viewable by a user, the display device supporting touchscreen functionality; and
    a compliant support disposed between the one or more computing components and the display device, the compliant support filling-in gaps in the cavity formed within the external enclosure and reducing deflection of the display device by compression of the compliant support, the deflection caused in response to contact against a surface of the display device, wherein the compliant support includes a first zone and a second zone, each comprising a same deformable material, the first zone and the second zone having different amounts of resistance to compression, wherein:
    the deformable material has a plurality of holes into which the deformable material flows when the compliant support is compressed, and
    the different amounts of resistance to compression are caused by the first zone having different sizes and/or frequency of holes than the second zone.

2. An apparatus as described in claim 1, wherein the compliant support is configured to reduce the deflection by the contact which is part of a touch input provided to interact with the touchscreen functionality of the display device.

3. An apparatus as described in claim 1, wherein the compliant support is configured to reduce the deflection by the contact and thereby reduce one or more artifacts that are made visual to a user by the display device.

4. An apparatus as described in claim 3, wherein the one or more artifacts are caused by disruption of liquid crystals of the display device.

5. An apparatus as described in claim 1, wherein the compliant support is configured using a foam or gel.

6. An apparatus as described in claim 1, wherein the compliant support is configured as a thermal pad that is configured to conduct heat generated by the display device or the computing components.

7. An apparatus as described in claim 1, wherein the computing components include a processor, memory, and one or more sensors.

8. An apparatus as described in claim 1, wherein the first zone is nested within the second zone.

9. An apparatus as described in claim 1, wherein the display device includes a display module configured as a liquid crystal display module or organic light emitting diode (OLED) display module.

10. An apparatus as described in claim 1, wherein the touchscreen functionality is supported by the display device using a touch panel assembly that is configured to detect proximity of one or more objects.

11. An apparatus as described in claim 1, further comprising a display device tray and wherein the compliant support is disposed between the display device and the display device tray.

12. An apparatus as described in claim 1, wherein the compliant support is configured to deform to cause the reduction in the deflection.

13. A mobile computing device comprising:
    an external enclosure configured to be held in one or more hands of a user;
    one or more computing components secured by and disposed within the external enclosure;
    a display device secured to the external enclosure such that the display device is viewable by a user, the display device supporting touchscreen functionality; and
    a compliant support disposed between the one or more computing components and the display device, the compliant support reducing deflection of the display device by deformation of the compliant support, the deflection caused in response to contact against a surface of the display device, wherein the compliant support includes a first zone and a second zone, each comprising a same deformable material, the first zone and the second zone having different amounts of resistance to compression, wherein:

the deformable material has a plurality of holes into which the deformable material flows when the compliant support is compressed; and the first zone has different sizes and/or frequency of holes than the second zone.

14. A mobile computing device as described in claim 13, wherein the first zone and the second zone are included in a single piece.

15. A mobile computing device as described in claim 13, wherein the external enclosure is configured as a housing for a mobile phone or tablet computer.

16. An apparatus comprising:

a display device tray;

a display device secured to the display device tray such that the display device is viewable by a user when secured to an external enclosure of a computing device, the display device supporting touchscreen functionality; and a compliant support disposed to conform and fill-in spaces between the display device tray and the display device, the compliant support reducing deflection of the display device by compression of the compliant support, the deflection caused in response to contact received to interact with the touchscreen functionality of the display device, wherein the compliant support includes a first zone and a second zone, each comprising a same deformable material, the first zone and the second zone having different amounts of resistance to compression, wherein:

the deformable material has a plurality of holes into which the deformable material flows when the compliant support is compressed, and the first zone has different sizes and/or frequency of holes than the second zone.

17. An apparatus as described in claim 16, wherein the external enclosure is configured as a housing for a mobile phone or tablet computer.

18. An apparatus as described in claim 16, wherein the compliant support is configured to reduce the deflection in a direction that is generally perpendicular to a surface of the display device.

19. A mobile computing device as described in claim 13, wherein the first zone is nested within the second zone.

20. An apparatus as described in claim 16, wherein the first zone is nested within the second zone.

\* \* \* \* \*